(12) United States Patent
You et al.

(10) Patent No.: US 12,606,451 B2
(45) Date of Patent: Apr. 21, 2026

(54) HEAT TREATMENT METHOD OF WASTE CATHODE MATERIALS AND LITHIUM RECOVERY METHOD USING SAME

(71) Applicant: DOOSAN ENERBILITY CO., LTD, Changwon (KR)

(72) Inventors: Jang Yong You, Suwon (KR); Wee Kwan Kang, Yongin (KR); Ho Yong Jo, Yongin (KR); Chae Soo Lee, Yongin (KR)

(73) Assignee: DOOSAN ENERBILITY CO., LTD, Changwon (KR)

( * ) Notice: Subject to any disclaimer, the term of this patent is extended or adjusted under 35 U.S.C. 154(b) by 1053 days.

(21) Appl. No.: 17/527,195

(22) Filed: Nov. 16, 2021

(65) Prior Publication Data

US 2022/0340439 A1    Oct. 27, 2022

(30) Foreign Application Priority Data

Apr. 23, 2021    (KR) ........................ 10-2021-0053108
Jun. 18, 2021    (KR) ........................ 10-2021-0079638

(51) Int. Cl.
*C01D 15/08*        (2006.01)
*C01D 15/02*        (2006.01)
(Continued)

(52) U.S. Cl.
CPC .............. *C01D 15/08* (2013.01); *C01D 15/02* (2013.01); *H01M 10/54* (2013.01); *H01M 2004/028* (2013.01)

(58) Field of Classification Search
CPC ....... C01D 15/08; C01D 15/02; H01M 10/54; H01M 2004/028; H01M 10/052;
(Continued)

(56) References Cited

U.S. PATENT DOCUMENTS 4,207,297 A * 6/1980 Brown ................... C01D 15/02
                                                         423/641
2011/0319659 A1* 12/2011 Yoshikawa ........... C01B 17/162
                                                         562/559
(Continued)

FOREIGN PATENT DOCUMENTS

CN        109248637      *   1/2019
JP        07109181 A     *   4/1995
(Continued)

OTHER PUBLICATIONS

KR20160180973 machine translation (Year: 2024).*
(Continued)

*Primary Examiner* — Michael Forrest
*Assistant Examiner* — Nicole Lee Quist
(74) *Attorney, Agent, or Firm* — Harvest IP Law, LLP

(57)        ABSTRACT
A method of heat-treating a waste cathode material to recover lithium carbonate from the waste cathode material, and a lithium carbonate recovery method using the waste cathode material heat treatment method are provided. The method of heat-treating the waste cathode material includes heating an interior of a heat treatment furnace by burning a hydrocarbon fluid in the heat treatment furnace and producing lithium carbonate ($Li_2CO_3$) and residual metal oxide by reacting a waste cathode material in the heat treatment furnace with $CO_2$ generated during burning of the hydrocarbon fluid.

16 Claims, 7 Drawing Sheets

(51) Int. Cl.
     *H01M 4/02* (2006.01)
     *H01M 10/54* (2006.01)

(58) Field of Classification Search
     CPC .. B01J 2208/00504; B01J 6/002; B01J 6/004;
     B01J 8/10
     See application file for complete search history.

(56) References Cited

U.S. PATENT DOCUMENTS

| | | | | |
|---|---|---|---|---|
| 2020/0313251 | A1 * | 10/2020 | La | H01M 4/525 |
| 2021/0273274 | A1 * | 9/2021 | Koo | H01M 10/54 |

FOREIGN PATENT DOCUMENTS

| | | | |
|---|---|---|---|
| JP | 2013126940 | A | 6/2013 |
| JP | 2020183559 | A | 11/2020 |
| KR | 20110024856 | A | 3/2011 |
| KR | 20160180973 | * | 12/2016 |
| KR | 101731213 | B1 | 4/2017 |
| KR | 101911633 | B1 | 10/2018 |
| KR | 101927044 | B1 * | 3/2019 |
| KR | 1020200052735 | A | 5/2020 |
| KR | 1020200114048 | A | 10/2020 |
| KR | 20210039555 | A | 4/2021 |
| WO | WO-2011081216 | A1 * | 7/2011 ............. B82Y 30/00 |

OTHER PUBLICATIONS

Innovation NewsNetwork, "Building Batteries: Why lithium and why lithium hydroxide?", Feb. 4, 2021.*
Jandova J., "Recovery of Lithium from Waste Materials", Journal Ceramics-Silikaty, 2012, vol. 56, Issue 1, p. 50-54.*
CN109248637A Machine Translation (Year: 2024).*
Dynamix Agitators, "Mixing 101:Baffled by Baffles?", Oct. 19, 2012.*
JP07109181A Machine Translation (Year: 2024).*
KR101927044B1 Machine Translation (Year: 2024).*
WO-2011081216-A1 machine translation (Year: 2011).*
KR Office Action dated Dec. 22, 2021.

* cited by examiner

Waste cathode
material (LNCM)

HEAT TREATMENT METHOD OF WASTE CATHODE MATERIALS AND LITHIUM RECOVERY METHOD USING SAME

CROSS REFERENCE TO RELATED APPLICATIONS

This application claims priority to Korean Patent Applications Nos. 10-2021-0053108, filed on Apr. 23, 2021 and 10-2021-0079638, filed on Jun. 18, 2021, the disclosures of which are incorporated herein by reference in their entireties.

BACKGROUND

1. Field

Apparatuses and methods consistent with exemplary embodiments relate to a waste cathode material heat treatment method for recovering lithium from the waste cathode material, and a lithium recovery method using the same.

2. Description of the Related Art

In the process of manufacturing a cathode material for a secondary battery, a large amount of waste cathode material that is discarded as defective or scraps is generated, and an attempt has been made to recover a transition metal including lithium from the waste cathode material.

According to a method of recovering lithium carbonate or lithium hydroxide through heat treatment from waste cathode materials such as NCM (i.e., nickel/cobalt/manganese), NCA (i.e., nickel/cobalt/aluminum), and LCO (i.e., lithium/cobalt), the waste cathode materials are heat-treated by injecting gas such as hydrogen, nitrogen, methane, or carbon dioxide, in a carbon dioxide condition or an oxygen-free reducing atmosphere so that lithium is converted into lithium oxide, lithium carbonate, etc. and is separated from the waste cathode materials.

When the lithium carbonate compound (S) produced in this way is washed with water, the lithium carbonate compound is separated into a solid transition metal material (e.g., Ni/Mn/Co/Al) and a liquid lithium carbonate (L), and the separated liquid lithium carbonate (L) is evaporated/concentrated to obtain high-purity lithium carbonate (S). In addition, lithium hydroxide can also be obtained by reacting the separated liquid lithium carbonate with metal hydroxide and then evaporating/concentrating it.

FIG. 1 illustrates an example of a related art heat treatment apparatus 10 for a waste cathode material. Referring to FIG. 1, the related art heat treatment method uses an indirect heating batch type heat treatment, in which the waste cathode material is loaded in a heat treatment furnace 12 and then indirectly heated in a $CO_2$ gas atmosphere fed from the outside, or the waste cathode material and carbon C or sodium carbonate (c) are loaded together and heat treated in an oxygen-free atmosphere.

However, in the related art indirect heating batch type heat treatment method, because a wall surface of the heat treatment furnace 12 is heated by a heating element 14, a large amount of deposits is produced on the inner wall of the heat treatment furnace 12. This causes many problems such as a decrease in recovery rate, an increase in operation time required for cooling and restart of the heat treatment furnace 12 to remove the produced deposits, a greater amount of deposits on the wall surface at higher temperature, a higher adhesion rate of deposits on the wall surface at higher temperature of the wall surface of the heat treatment furnace 12 than the internal set temperature that is characteristic of the indirect heating method, restricted adhesion prevention of deposits on the wall surface due to shape deformation of a stirrer, and restricted capacity increase due to increase in thickness of stirrer due to expansion of the heat treatment furnace 12.

In addition, because $CO_2$ gas is injected from the outside to increase the amount of $CO_2$ gas used, there are problems in that manufacturing cost increases and an environmental issue such as carbon emission occurs due to emission of unreacted $CO_2$ gas.

SUMMARY

Aspects of one or more exemplary embodiments provide a waste cathode material heat treatment method capable of improving productivity by suppressing a wall adhesion deposit while minimizing the amount and emission of $CO_2$ gas, and a lithium carbonate recovery method using the same.

Additional aspects will be apparent in part in the description which follows and, in part, will become apparent from the description from the following description, or may be learned by practice of the exemplary embodiments.

According to an aspect of an exemplary embodiment, there is provided a method of heat-treating a waste cathode material, the method including: heating an interior of a heat treatment furnace by burning a hydrocarbon fluid in the heat treatment furnace; and producing lithium carbonate ($Li_2CO_3$) and residual metal oxide by reacting a waste cathode material in the heat treatment furnace with $CO_2$ generated during burning of the hydrocarbon fluid.

An internal temperature of the heat treatment furnace obtained through burning of the hydrocarbon fluid may range from 500 to 800° C.

An internal pressure of the heat treatment furnace may be in 0.1 to 1 bar.

The heat treatment furnace may include at least one striking device disposed on an outer circumferential surface thereof.

The at least one striking device may be arranged in a plurality of rows at intervals in a longitudinal direction of the heat treatment furnace.

The heat treatment furnace may include a plurality of baffles protruding in a radial direction.

The heat treatment furnace may be divided into a first region in which an inlet is disposed, a second region connected to the first region, and a third region connected to the second region and in which a burner is disposed, and a greater number of baffles may be disposed in the second region than in the first region.

The baffle disposed in the first to third regions may have a sheet plate shape.

The method may further include discharging the produced lithium carbonate ($Li_2CO_3$) and residual metal oxide through an outlet.

A height of the outlet may be lower than that of an inlet into which the waste cathode material is loaded.

The heat treatment furnace may be rotatable.

The burning may be performed such that $CO_2$ content of the exhaust gas is 11 to 14% by volume.

The heat treatment furnace may be provided on one side thereof with a burner using the hydrocarbon fluid as a fuel.

The hydrocarbon fluid may include LPG or LNG.

After being discharged to the outside of the heat treatment furnace, the exhaust gas may be re-supplied back to the heat treatment furnace.

30 to 60% of the exhaust gas may be re-supplied to the heat treatment furnace.

According to an aspect of another exemplary embodiment, there is provided a lithium carbonate recovery method including: washing lithium carbonate ($Li_2CO_3$) and residual metal oxide produced by the waste cathode material heat treatment method with water to phase-separate liquid lithium carbonate and solid residual metal; and recovering solid lithium carbonate by evaporation and condensation/crystallization of the separated liquid lithium carbonate.

The method may further include recovering solid lithium hydroxide by reacting the separated liquid lithium carbonate with a metal hydroxide to produce liquid lithium hydroxide (LiOH) and evaporating/condensing/crystallizing the produced liquid lithium hydroxide (LiOH).

According to one or more exemplary embodiments, because the waste cathode material is directly heated by a hydrocarbon fluid burned in the heat treatment furnace, the wall surface temperature of the heat treatment furnace can be lowered more than the internal fluid temperature, thereby minimizing a reduction in productivity due to wall adhesion. Here, the rotation of the heat treatment furnace further restricts the contact and adhesion of the heat-treated waste cathode material to the wall surface, thereby enabling a uniform contact and reaction between the waste cathode material and exhaust gas.

Further, the waste cathode material may be easily separated from the wall by an impact applied to the heat treatment furnace during the heat treatment process.

In addition, according to one or more exemplary embodiments, $CO_2$ gas contained in the exhaust gas produced during combustion of a hydrocarbon fluid reacts with the waste cathode material during the heat treatment process. Accordingly, additional input of $CO_2$ gas is not required, and when the exhaust gas is re-supplied to the heat treatment furnace through a recirculation device, a positive pressure $CO_2$ atmosphere is created inside the heat treatment furnace, thereby inducing a smoother reaction. If the temperature of the recirculated exhaust gas is controlled by a separate cooling device, the temperature and $CO_2$ concentration of the heat treatment furnace can be controlled more easily.

BRIEF DESCRIPTION OF THE DRAWINGS

The above and other aspects will be more apparent from the following description of the exemplary embodiments with reference to the accompanying drawings, in which.

4

Figure 5:
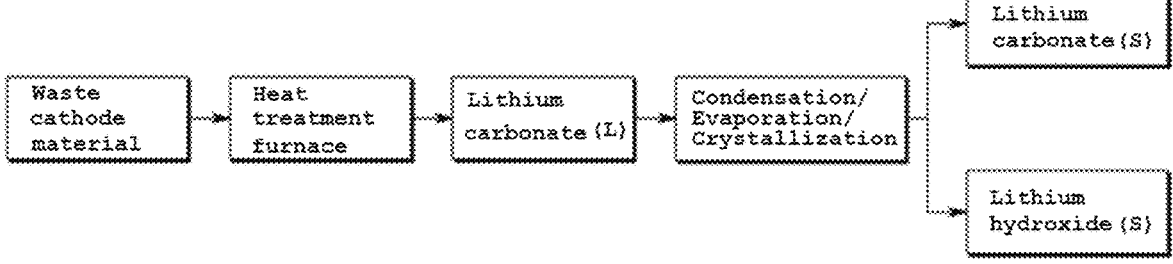
FIG. 5 is a flowchart illustrating a lithium recovery process using the heat treatment method according to an exemplary embodiment.
Figure 6:
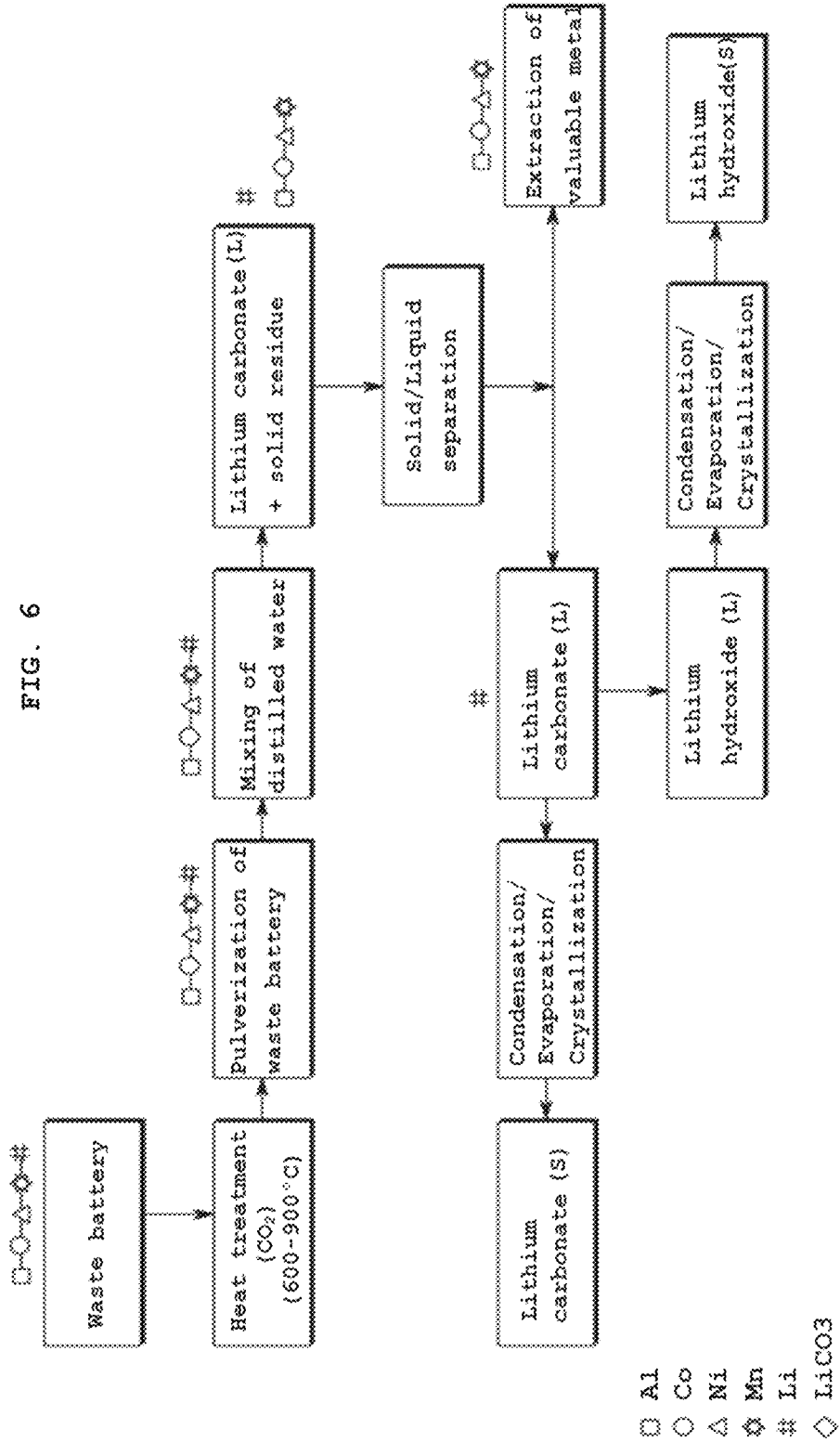
Figure 7:
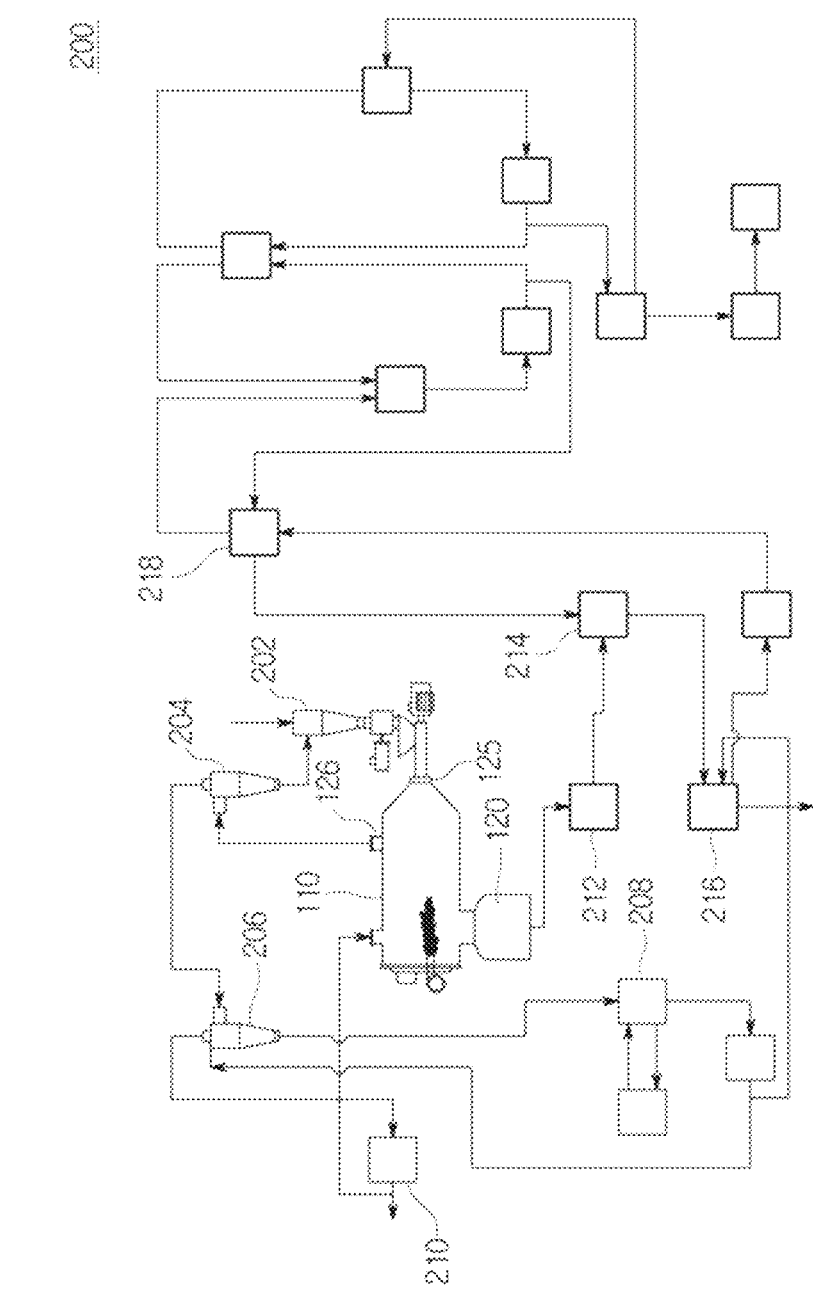
Figure 8:
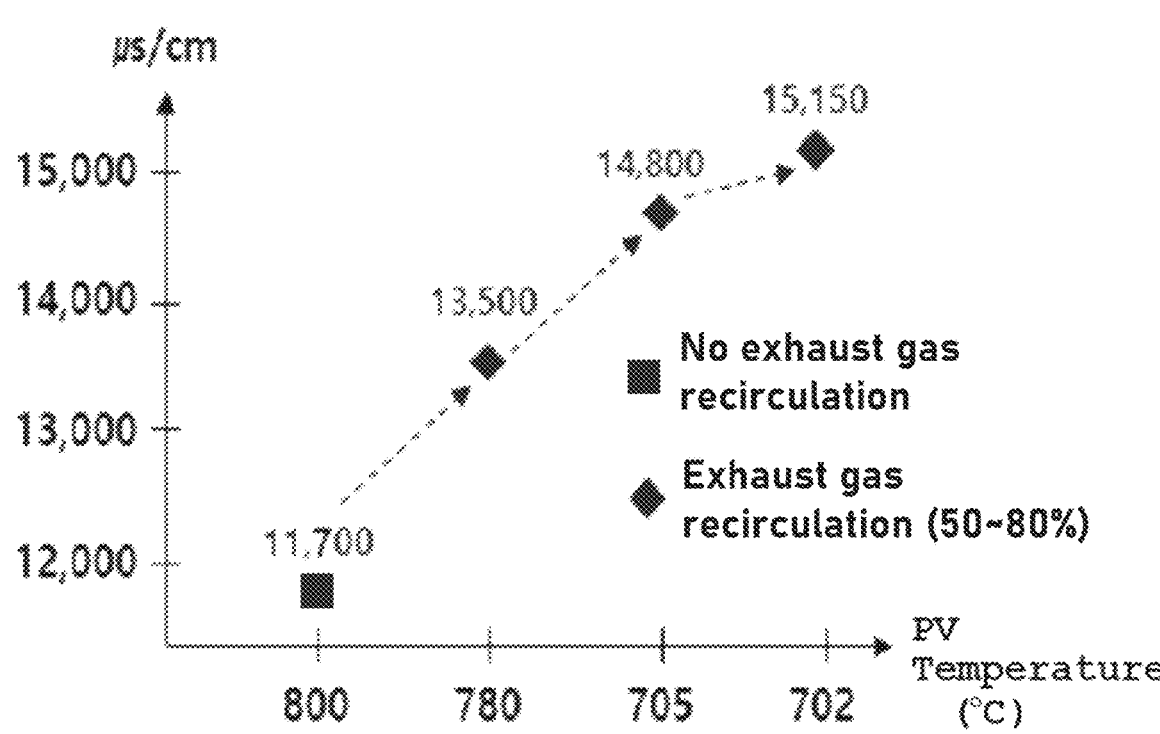
Figure 9:
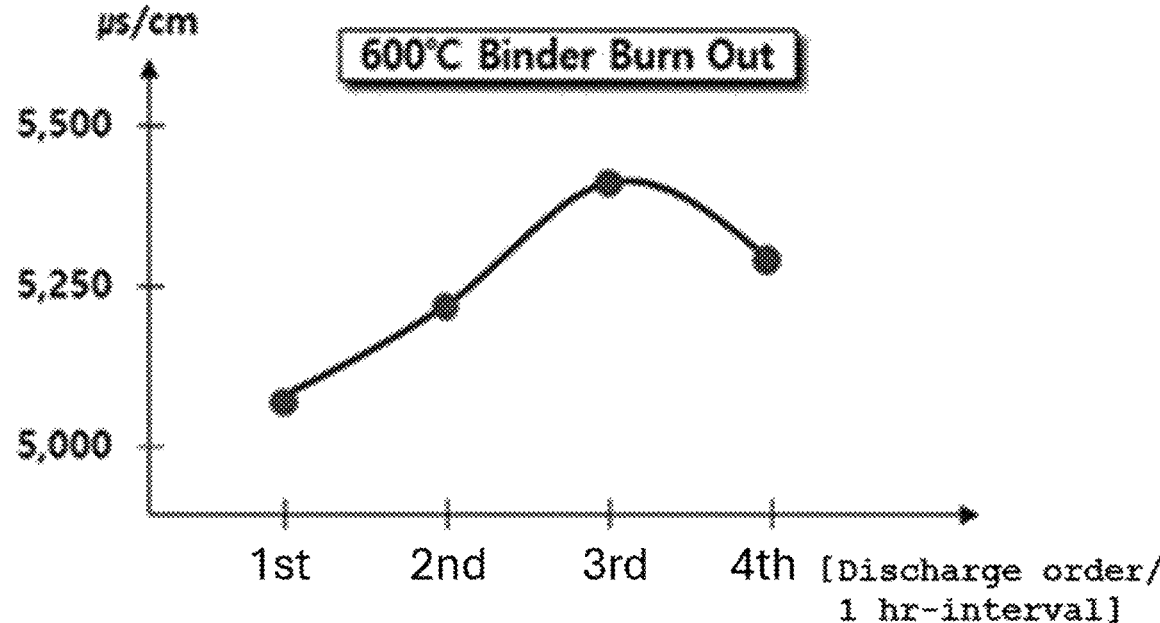

FIG. 6 is a flowchart illustrating the lithium recovery process of FIG. 5 in more detail;

FIG. 7 is a schematic diagram illustrating a recovery apparatus for performing the lithium recovery process;

FIG. 8 is a graph illustrating an amount of lithium recovery according to exhaust gas recirculation; and FIG. 9 is a graph illustrating a test result of burning out the binder (PVDF).

DETAILED DESCRIPTION

Various modifications and various embodiments will be described below in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

The terminology used herein is for the purpose of describing specific embodiments only and is not intended to limit the scope of the disclosure. The singular expressions "a", "an", and "the" are intended to include the plural expressions as well unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Exemplary embodiments will be described below in detail with reference to the accompanying drawings. It should be noted that like reference numerals refer to like parts throughout the various figures and exemplary embodiments. In certain embodiments, a detailed description of functions and configurations well known in the art may be omitted to avoid obscuring appreciation of the disclosure by a person of ordinary skill in the art. For the same reason, some components may be exaggerated, omitted, or schematically illustrated in the accompanying drawings.

Hereinafter, a heat treatment apparatus according to an exemplary embodiment will be described with reference to the accompanying drawings.

Figure 1:
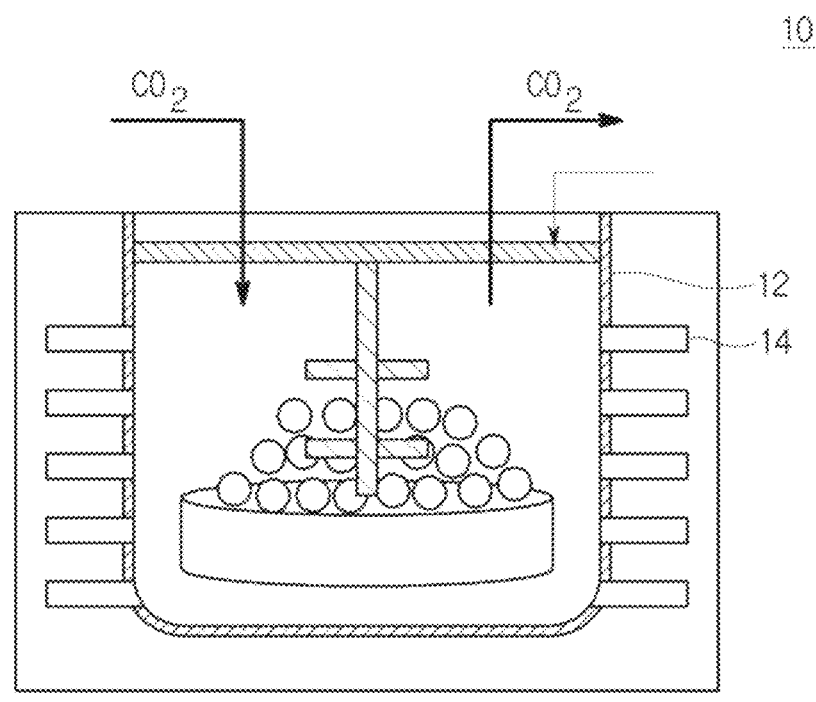
FIG. 1 is a schematic diagram illustrating a related art indirect heating batch type heat treatment apparatus.
Figure 2:
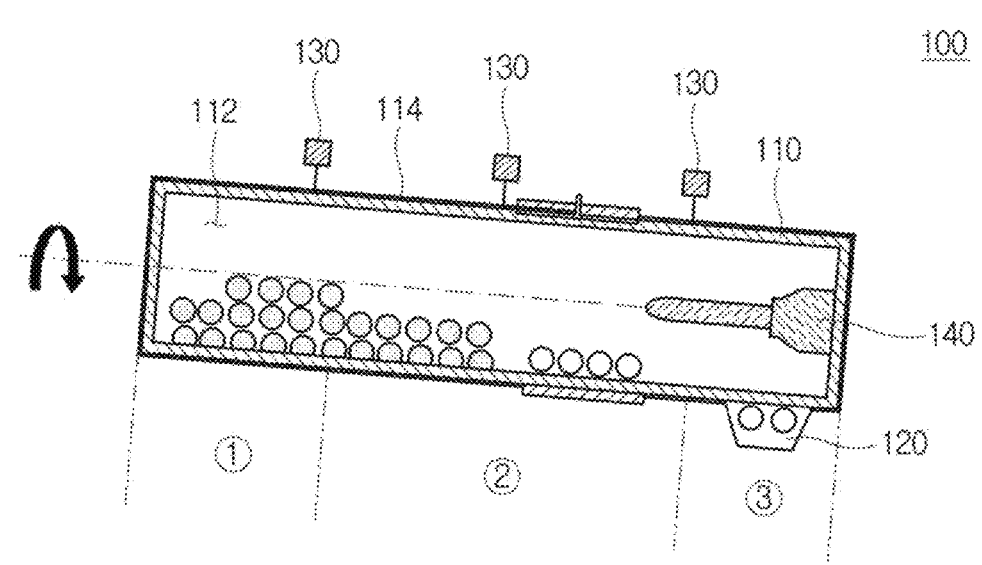
FIG. 2 is a schematic diagram illustrating a process in which a $CO_2$ atmosphere is generated in a direct heating type heat treatment apparatus by a heat treatment method according to an exemplary embodiment.

FIG. 2 illustrates a process in which a $CO_2$ atmosphere is generated in a direct heating type heat treatment apparatus 100 by a heat treatment method according to an exemplary embodiment. Referring to FIG. 2, a heat treatment furnace 110 of the heat treatment apparatus 100 has a hollow cylindrical shape and is internally provided with a heat treatment space 112 into which a heat treatment object, that is, a waste cathode material is loaded. However, it is understood that the heat treatment object is not limited thereto. For example, the heat treatment object may include a cathode material recovered from defective product produced during processing a cathode material for secondary batteries, a cathode material recovered from cathode scraps generated during a battery manufacturing process, and a waste cathode material recovered from a waste battery used in an electric vehicle or ESS.

The heat treatment furnace 110 may include an inlet into which a waste cathode material is input and an outlet 120 through which the heat treated waste cathode material is discharged. The inlet and outlet 120 are spaced apart from each other along a longitudinal direction of the heat treatment furnace 110. Here, the heat treatment furnace 110 is inclined with respect to the gravity direction such that a height of the outlet 120 is lower than that of the inlet. This configuration has a structure in which the waste cathode material injected during the heat treatment process can be discharged by gravity while moving toward the outlet 120. The inclined angle of the heat treatment furnace 110 may range from 0.5° to 2° with respect to the ground surface. If the inclined angle is too small, the residence time may increase, whereas if the inclined angle is too large, the residence time may decrease.

The heat treatment furnace 110 is rotatable by a motor, and a rotational speed may be appropriately adjusted according to an amount of the input waste cathode material, the degree of internal combustion, a concentration of $CO_2$, and the like. The rotational speed of the heat treatment furnace 110 may preferably be set to 1 rpm to 10 rpm to facilitate the transfer and internal stirring of raw materials. If the rotational speed is slow, the productivity may be reduced due to prolonged transfer of the raw material, and if the rotational speed is fast, the residence time of the waste cathode material in the heat treatment furnace 110 may decrease, thereby inhibiting the reaction of the waste cathode material.

Here, a suitable residence time of the reactants may range from 1 to 4 hours. However, it is understood that the residence time may be adjusted by adjusting an input, a length, a rotational speed, or an angle of the heat treatment furnace 110.

The internal pressure of the heat treatment furnace 110 is preferably maintained at 0.1 to 1 bar. If the internal pressure of the heat treatment furnace 110 is vacuum, the reaction between lithium and carbon dioxide in the waste cathode material powder may not be performed well, and if the internal pressure increases, the partial pressure of carbon dioxide increases so that the reaction rate is improved. However, if the internal pressure is 1 bar or more, it is necessary to increase the performance of a burner 140 and a blower for re-supplying exhaust gas, and additional measures to prevent leakage are required.

The outside of the heat treatment furnace 110 is covered with a thermal insulating cover 114 or any suitable insulating material on which a striking device 130 may be mounted. A plurality of striking devices 130 may be mounted on the heat treatment furnace 110. The striking devices 130 may separate a waste cathode material deposited on an inner wall surface of the heat treatment furnace 110 by applying an impact the wall surface of the heat treatment furnace 110.

A burner 140 for burning a hydrocarbon fluid is mounted on one side of the heat treatment furnace 110. For example, the burner 140 may be mounted inside of the heat treatment furnace 110, or the burner 140 may be provided outside the heat treatment furnace 110 such that a hydrocarbon fluid is burned inside the heat treatment furnace 110 during combustion.

The hydrocarbon fluid may be liquefied or gaseous, for example, LPG, LNG, or the like. However, it is understood that the hydrocarbon fluid is not limited thereto, and any form that reacts with oxygen during combustion to produce $CO_2$ gas may be used.

For example, the combustion reaction of LPG and LNG is as follows:

$$LPG: C_3H_8(g) + 5O_2(g) \rightarrow 3CO_2(g) + 4H_2O(g)$$

$$LNG: CH_4(g) + 2O_2(g) \rightarrow CO_2(g) + 2H_2O(g)$$

Figure 3:
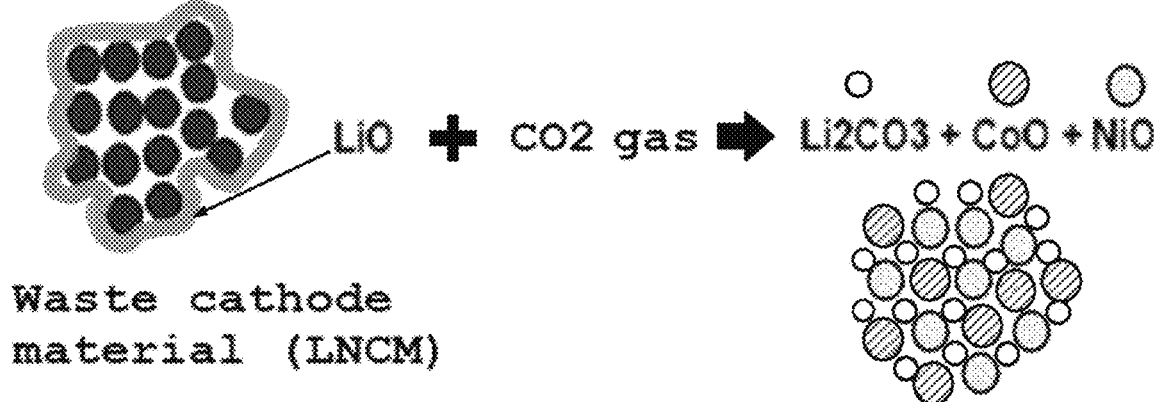
FIG. 3 is a flowchart illustrating a chemical reaction in which lithium carbonate is formed from a waste cathode material by a heat treatment method according to an exemplary embodiment.

Referring to FIG. 3, the internal space of the heat treatment furnace 110 is heated by the combustion of a hydrocarbon fluid. The internal space of the heat treatment furnace 110 is filled with $CO_2$ atmosphere due to $CO_2$ contained in an exhaust gas, and the waste cathode material reacts with $CO_2$ to produce lithium carbonate ($Li_2CO_3$) and residual metal oxide.

Unlike the related art, because the heat treatment furnace 110 is performed while generating $CO_2$ gas by the combustion of the hydrocarbon fluid participates in the reaction without supplying $CO_2$ gas from the outside, the overall structure may be simplified and $CO_2$ usage may be remarkably reduced.

In the combustion process in the burner 140, it is preferable to adjust an air-fuel ratio so that concentrations of oxygen ($O_2$) and carbon dioxide ($CO_2$) in the exhaust gas are 0.5 to 2% and 11 to 14%, respectively. If the oxygen content is 2% or more, carbonation may not be performed well. Depending on the type of reactant (i.e., waste cathode material), the air-fuel ratio may be adjusted so that carbon monoxide (CO) content in the exhaust gas is 1000 ppm or less. However, in this case, it is necessary to install CO prevention facility. If the required $CO_2$ flow rate is greater than an amount of $CO_2$ supplied from the exhaust gas, a separate $CO_2$ may be supplied from the outside. Although the complexity of the apparatus may increase, it is still possible to reduce $CO_2$ usage compared to the related art.

Instead of supplying $CO_2$ from the outside, a portion of the exhaust gas discharged from the heat treatment furnace 110 may be re-supplied to the heat treatment furnace 110. That is, the exhaust gas is re-supplied so that non-reacted $CO_2$ remaining in the exhaust gas is recycled. As such, the heat treatment may be performed without a separate supply of $CO_2$, and harmful gas such as hydrocarbons, CO and NOx contained in the exhaust gas may be reduced.

After being discharged from the heat treatment furnace 110 and cooled or heated, the exhaust gas may be supplied. Because the internal temperature of the heat treatment furnace 110 may change due to the supply of the exhaust gas, the exhaust gas may be re-supplied after properly adjusting the temperature to avoid the change.

Referring to FIG. 2, when the internal space of the heat treatment furnace 110 is divided into three space sections in a direction from the inlet to the outlet 120, the space section adjacent to an end opposite to an end in which the burner 140 is disposed is referred to as a first region ①, the middle space section is referred to as a second region ②, and the space section adjacent to the burner 140 is referred to as a third region ③. The exhaust gas may be supplied to the first region, the second region, and the third region. Here, the first region is provided with the inlet through which the waste cathode material is loaded.

Because the first and second regions are located relatively far from the burner 140, a sufficient amount of heat may not be supplied. In order to prevent this, if an amount of heat supplied from the burner 140 is increased, the temperature of the third region adjacent to the burner 140 may be excessively increased, thereby increasing the adhesion rate or the like.

However, as described above, it is possible to uniformly raise the internal temperature of the heat treatment furnace 110 by injecting high-temperature exhaust gas into the first and second regions. In addition, the waste cathode material disposed in the first and second regions requires a larger amount of $CO_2$ because the first and second regions exhibit relatively low reacting performance compared to the third region. Accordingly, it is necessary to supply the exhaust gas to the first and second regions to further promote the reacting performance and increase the amount of the exhaust gas used.

In addition, if the temperature of the third region adjacent to the burner 140 is excessively increased, a cooled exhaust gas may be supplied to the third region, thereby reducing the adhesion rate and obtaining an effect according to the circulation of the exhaust gas.

Here, the input of the exhaust gas is preferably 30 to 60% of the exhaust gas generated in the combustion process in the burner 140. If the input of the exhaust gas is less than 30%, the exhaust amount is insufficient and the effect of exhaust gas cannot be sufficiently obtained. If the input of the exhaust gas is more than 60%, because the exhaust amount in the heat treatment furnace increases, it is necessary to increase the capacity of the related equipment by adding heat to maintain the internal temperature, so that the process efficiency decreases.

Figure 4:
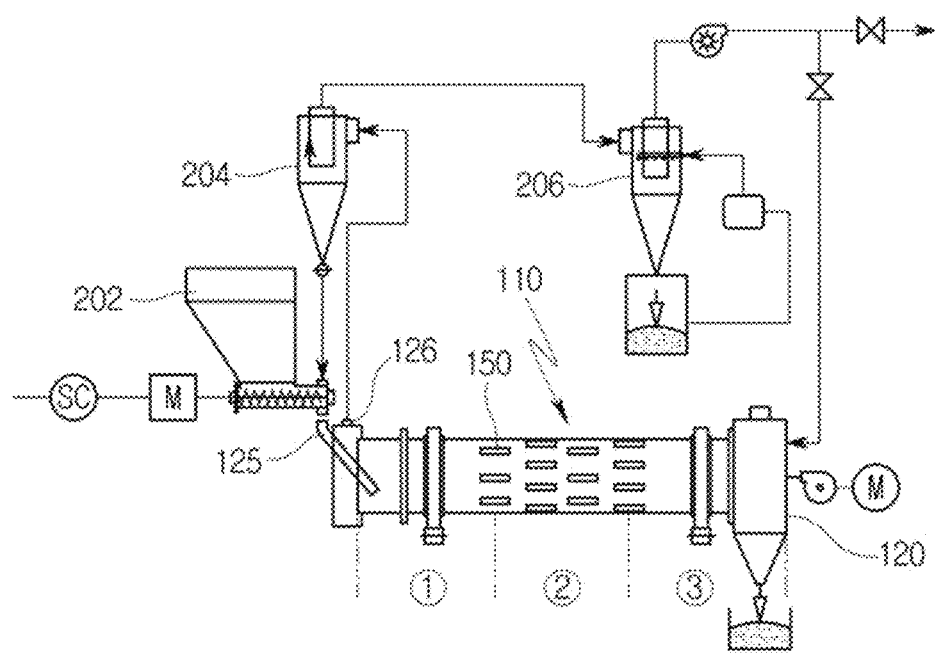
FIG. 4 is a schematic diagram illustrating a heat treatment furnace having a baffle according to an exemplary embodiment.

FIG. 4 schematically illustrates the heat treatment furnace 110 having baffles 150. The baffle 150 has a shape protruding radially from the inner wall surface of the heat treatment furnace 110 to prevent the input reactants from adhering to the inner wall surface of the heat treatment furnace 110 and increase the contact area with the exhaust gas. For example, three to nine baffles 150 may be installed in a circumferential direction so that samples can be stirred well, and may be installed in a plurality of rows along a longitudinal direction. In this case, when viewed from one end of the heat treatment furnace 110, the baffles 150 provided in each row may be alternately disposed.

The baffles 150 may not be installed near the outlet 120 adjacent to burning flame and near the inlet 125 or an outlet port 126, otherwise no more than three baffles may be installed there. In this case, the baffle 150 may have a sheet-like shape. If the baffles 150 are installed near the inlet 125 or the outlet port 126, a large amount of raw material is scattered, increasing the amount of raw material lost in the exhaust gas. Further, if the baffles 150 are installed near the outlet 120, there is a risk of lithium volatilization or decomposition of chemically reacted lithium carbonate due to the high temperature obtained by the contact between the reactants and the combustion flame.

The length of the baffle 150 may be 0.5 times the diameter of the heat treatment furnace 110, and the height of the baffle may be 0.1 times the diameter of the heat treatment furnace 110. In addition, the baffle 150 may be an elongated sheet plate or may have a form of a hook.

Referring to FIG. 4, the baffles 150 may be installed in a plurality of rows. For example, although the baffles 150 are disposed in the first to third regions ①, ②, ③, the baffles 150 may not be installed in some regions such as the first or third region.

As described above, the number of baffles 150 provided in each row may be set to have the same or different number.

FIG. 5 schematically illustrates a lithium recovery process using the heat treatment method according to an exemplary embodiment, and FIG. 6 illustrates the lithium recovery process of FIG. 5 in more detail. Referring to FIGS. 5 and 6, the waste cathode material is heat-treated through the heat treatment furnace 110 and pulverized. At this time, it is preferable to pulverize the waste cathode material to a size of 500 μm or less to facilitate water leaching through a ball mill.

Thereafter, the liquid lithium carbonate may be phase-separated from the solid residual metal oxide through a water washing process, and then recovered as solid lithium carbonate through an evaporation and condensation process.

In addition, the separated liquid lithium carbonate is reacted with metal hydroxide such as calcium hydroxide ($Ca(OH)_2$) or barium hydroxide ($Ba(OH)_2$) to phase-separate the liquid lithium hydroxide (LiOH), which is recovered as solid lithium hydroxide through evaporation and condensation.

FIG. 7 schematically illustrates a recovery apparatus 200 for performing the lithium recovery process. Referring to FIG. 7, a waste cathode material is supplied through a hopper 202 connected to the inlet 125 of the heat treatment furnace 110, is heat-treated and discharged to the outside. Here, the heat treatment furnace 110 includes an outlet port 126 for discharging an exhaust gas, the outlet port 126 being connected to a primary cyclone 204. The primary cyclone 204 collects the waste cathode material powder contained in the exhaust gas to reduce material waste by re-supplying the collected waste cathode material powder to the hopper 202.

For example, the primary cyclone 204 may employ any filter unit such as a bag filter in addition to the above-described cyclone method.

The exhaust gas in which the waste cathode material powder is filtered through the primary cyclone 204 is supplied to a secondary cyclone 206. The secondary cyclone 206 filters out remaining foreign substances and cools the exhaust gas through heat exchange between cooling water supplied from a cooling water tank 208 and the exhaust gas. For example, the cooling water is injected toward the exhaust gas from the secondary cyclone 206 to cool the exhaust gas and collect fine powder contained in the exhaust gas. Because the exhaust gas is cooled by the cooling water, the exhaust gas does not damage a blower fan 210 installed to supply the exhaust gas to the heat treatment furnace 110.

A pressure filter may be used in the secondary cyclone 206 to recover a small amount of powder.

A portion of the cooled exhaust gas is re-supplied to the atmosphere and the remaining portion of the cooled exhaust gas is supplied to the heat treatment furnace 110 by the blower fan 210.

Here, the ratio of the exhaust gas discharged to the atmosphere and the temperature of the exhaust gas supplied to the heat treatment furnace 110 may be appropriately adjusted according to the heat treatment situation.

The heat-treated waste cathode material is supplied to a ball mill 212 through the outlet 120 and pulverized to a size of 500 μm or less. The pulverized waste cathode material is transferred to a stirring unit 214 and leached with distilled water. At this time pure water (e.g., 5 μs/cm or less) is used as distilled water, and the weight ratio of waste cathode material to water is 1:20 to 1:50.

The water leaching is carried out for 30 minutes to 2 hours, and the water leaching may be performed by dry crushing and stirring unit or only by a wet crushing device. The water-leached mixture is supplied to a filter unit 216 for solid-liquid separation. Valuable metals such as aluminum, cobalt, nickel, and manganese present in the mixture are separated by the filter unit 216. The separated valuable metal may be dried by a dryer. When the valuable metal is separated, a lithium carbonate or lithium contained solution is extracted and transferred to a rotary crystallization device (CDI) 218 to produce lithium carbonate products.

The transferred separation solution is crystallized into lithium carbonate in the rotary crystallization device 218. The rotary crystallization device 218 includes a common CDI, a charged water tank, a rotary CDI, a discharged water tank, and a vacuum filter. When lithium carbonate is crystallized in the discharged water tank, an endothermic reaction occurs, so a heater is used to maintain the discharged water tank at temperature 10° C. higher than room temperature using a heater to increase the crystallization efficiency.

An example of the process in the rotary crystallization device 218 is as follows:

1. The water-leached solution is transferred to the charged water tank, and the discharged water tank is filled with a saturated lithium carbonate solution;
2. The water-leached solution in the charged water tank is supplied to the rotary CDI and charged for 4 to 5 minutes;
3. In this case, process conditions are provided such that charging voltage is 1.5V and the rotational speed is 60 to 100 rpm;
4. After the charged water-leached solution is discharged back to the charged water tank, the saturated lithium carbonate solution in the discharged water tank is supplied;
5. Discharge for 4 to 5 minutes under process conditions of 1.8V of charging voltage and 60 to 100 rpm of rotational speed;
6. If crystals of 5 to 10 wt % or more are generated in the discharged water tank by repeating this process, a portion of discharged water is transferred to a dehydrator (e.g., pressure filter, centrifugal separator, vacuum belt filter) for solid-liquid separation;
7. In this case, a washing process may be added to increase the purity;
8. The separated liquid returns to the discharged water tank;
9. The separated lithium carbonate is dried by a dryer (e.g., drum dryer, fluid bed dryer) and stored; and
10. When the water-leached solution in the charged water tank is less than 8,000 mg/l, the solution is transferred to a mixing tank to increase the concentration to a level of 10,000 to 12,000 mg/l.

Experimental Example 1

FIG. Bis a graph showing an effect of exhaust gas recirculation in the heat treatment furnace. Referring to FIG. 8, when only the exhaust gas of the burner is used without recirculation of exhaust gas, the conductivity of lithium recovery was 11700 μs/cm, while when the exhaust gas was supplied at the exhaust gas recirculation rate of 0.5 to 0.8, the conductivity of lithium recovery was increased to 15150 μs/cm.

[Experimental Example 2] Analysis for Exhaust Gas of Heat Treatment Furnace

As a result of analyzing the exhaust gas from the heat treatment furnace through a CO, $CO_2$ and 02 measuring instrument, it was found to be CO (5 to 600 ppm), $CO_2$ (6.0 to 12%), and 02 (7 to 10%).

In addition, it was confirmed that the lithium recovery rate decreased as the amount of 02 discharged from the inside of the heat treatment furnace increased.

[Experimental Example 3] Internal Temperature of Heat Treatment Furnace for Each Section at 800° C.

It was confirmed that the outlet closest to the burner was 700° C., the middle portion was 600° C., and the inlet farthest from the burner was 480° C.

[Experimental Example 4] Exhaust Gas Analysis Upon Changing Combustion Conditions at 800° C.

It is possible to control 02 atmosphere (e.g., less than 4%) in the heat treatment furnace with DAMPER. Upon changing a DAMPER opening/closing rate from 30% to 45%, exhaust gas content is shown in Table 1 below.

TABLE 1

| Combustion Conditions | CO (ppm) | $CO_2$ (%) | $O_2$ (%) |
|---|---|---|---|
| Before Change | 6.0 to 600 | 9.0 to 10.5 | 5.0 to 8.0 |
| After Change | 1.0 to 90 | 11.0 to 13 | 1.4 to 3.0 |

[Experimental Example 5] Binder (PVDF) Burn Out TEST (Rotation 40, FAN 35, Feeder 40, at 600° C.)

Referring to FIG. 9, heat treatment was performed in an oxidizing atmosphere ($O_2$) without $CO_2$ supply, and as the binder was removed, changes in the chemical reaction between Li (lithium) and $CO_2$ were observed. As a result, it could be indirectly confirmed that the lithium carbonate water leachate showed a transparent color without yellow due to the fluorine compound contained in the waste cathode material, and that sufficient carbonation was achieved.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A method of heat-treating a waste cathode material using a heat treatment furnace having a burner and an inlet, the heat treatment furnace being into a first region in which the inlet is disposed, a third region in which the burner is disposed, and a second region disposed between and connected to the first and third regions, the method comprising:

supplying the waste cathode material via the inlet;

generating a combustion gas including $CO_2$ inside the heat treatment furnace and heating an interior of the heat treatment furnace using the combustion gas, by burning a hydrocarbon fluid by the burner inside the heat treatment furnace;

reacting the waste cathode material in the heat treatment furnace using $CO_2$ included in at least a first portion of the combustion gas before the first portion of the combustion gas is discharged from the heat treatment furnace and thereby producing lithium carbonate ($Li_2CO_3$) and residual metal oxide inside the heat treatment furnace;

discharging a second portion of the combustion gas including $CO_2$ to the outside of the heat treatment furnace, and re-supplying at least a portion of the second portion of the combustion gas including $CO_2$ back to the heat treatment furnace via a re-supply port;

cooling a third portion of the combustion gas discharged from the heat treatment furnace; and re-circulating the cooled third portion of the combustion gas into the heat treatment furnace via another re-supply port, which is positioned in the third region, such that a temperature of the third region is decreased and the temperature difference between the first region and the third region is reduced.

2. The method according to claim 1, wherein an internal temperature of the heat treatment furnace obtained through burning of the hydrocarbon fluid ranges from 500 to 800° C.

3. The method according to claim 1, wherein an internal pressure of the heat treatment furnace is in a range of 0.1 to 1 bar.

4. The method according to claim 1, wherein the heat treatment furnace includes at least one striking device disposed on an outer circumferential surface thereof.

5. The method according to claim 4, wherein the at least one striking device is arranged in a plurality of rows at intervals in a longitudinal direction of the heat treatment furnace.

6. The method according to claim 1, wherein the heat treatment furnace includes a plurality of baffles protruding in a radial direction.

7. The method according to claim 6,
wherein a greater number of baffles are disposed in the second region than in the first region.

8. The method according to claim 7, wherein the baffle disposed in the first to third regions has a sheet plate shape.

9. The method according to claim 1, further comprising discharging the produced lithium carbonate ($Li_2CO_3$) and residual metal oxide through an outlet.

10. The method according to claim 9, wherein a height of the outlet is lower than that of an inlet into which the waste cathode material is loaded.

11. The method according to claim 1, wherein the heat treatment furnace is rotatable.

12. The method according to claim 1, wherein the burning is performed such that $CO_2$ of the combustion gas is 11 to 14% by volume.

13. The method according to claim 1, wherein the hydrocarbon fluid comprises LPG or LNG.

14. The method according to claim 1, wherein 30 to 60% of the combustion gas discharged from the heat treatment furnace is re-heated and re-circulated into the heat treatment furnace.

15. A method according to claim 1, further comprising:
washing the produced lithium carbonate ($Li_2CO_3$) and residual metal oxide with water to phase-separate liquid lithium carbonate and solid residual metal; and
recovering solid lithium carbonate by evaporation, condensation and crystallization of the separated liquid lithium carbonate.

16. The method according to claim 15, further comprising recovering solid lithium hydroxide by reacting the separated liquid lithium carbonate with a metal hydroxide to produce liquid lithium hydroxide (LiOH) and performing steps of evaporating, condensing, and crystallizing the produced liquid lithium hydroxide.

* * * * *